(No Model.)
H. D. WHITE.
HORSE POWER PUMPING APPARATUS.
No. 380,840. Patented Apr. 10, 1888.
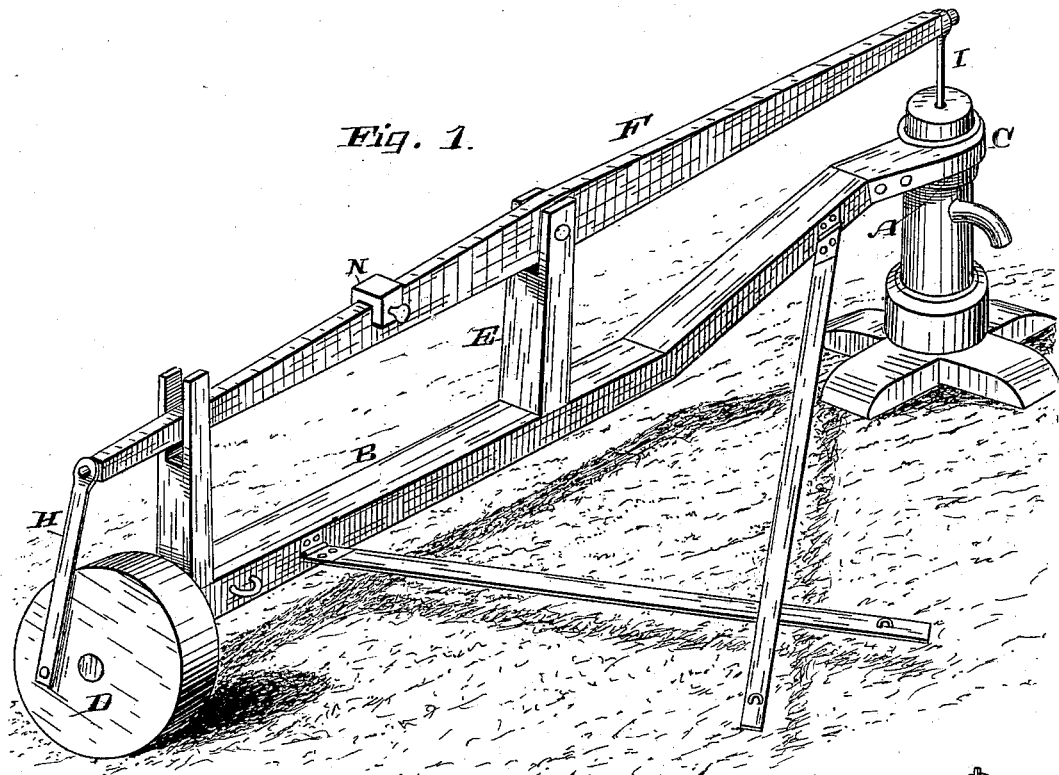
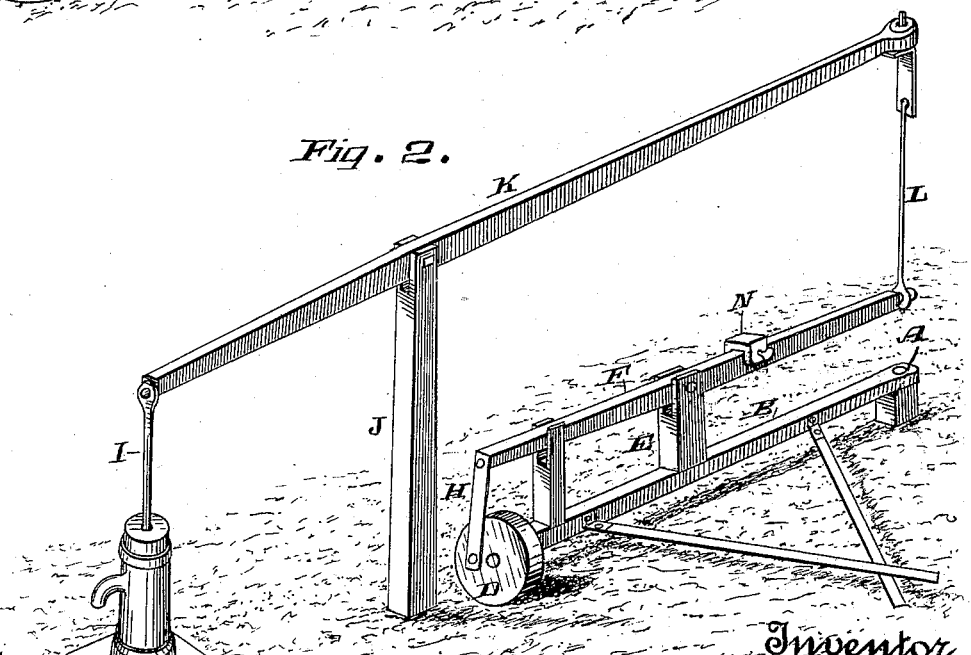

UNITED STATES PATENT OFFICE.

HARRY D. WHITE, OF COTTONWOOD, CALIFORNIA.

HORSE-POWER PUMPING APPARATUS.

SPECIFICATION forming part of Letters Patent No. 380,840, dated April 10, 1888.

Application filed August 24, 1887. Serial No. 247,790. (No model.)

*To all whom it may concern:*

Be it known that I, HARRY D. WHITE, of Cottonwood, Shasta county, State of California, have invented an Improvement in Horse-Power Pumping Apparatus, of which the following is a specification.

My invention relates to a novel horse-power and pumping apparatus; and it consists of a horizontal arm fixed to turn about a central vertical pivot, and having a wheel journaled to its outer end, so as to travel upon the ground about the central pivot, a lever-arm fulcrumed on a post fixed upon the horizontal traveling bar and connected by a pitman with the crank-pin upon the traveling wheel, together with a pump and an intermediate lever, one end connected with the first oscillating lever and the other with the pump.

Referring to the accompanying drawings for a more complete explanation of my invention, Figure 1 is a view of my device, showing the pump actuated directly from the primary lever. Fig. 2 shows the pump outside of the circle of travel of the wheel and actuated by the secondary lever.

A is a central vertical pivot, and B is an arm or bar connected with the pivot by a loosely-turning band or strap, C, and having journaled upon the outer end a wheel, D, the periphery of which rests upon the ground and supports the outer end of the arm. To one side of the arm are attached shafts or means for attaching the horse, so that when he travels around the central pivot in a circle the arm will turn about the pivot, by reason of the surrounding band or strap, while the wheel at the outer end travels in a circle upon the ground.

Upon the arm B is fitted a post, E, the upper end of which is slotted or mortised, so as to receive the lever F, which is centrally fulcrumed therein. The outer end of this lever is connected by a pitman, H, with a crank-pin upon the wheel D, so that as the latter travels around its circle the lever is caused to oscillate.

In some cases the pump may be situated in the center, about which the arm and wheel travel, in which case the pump-rod I may be connected with the end of the lever F, which projects over the center, and the pump will be operated directly from this lever. In many cases, however, it is inconvenient to place the central pivot upon or in connection with the pump, and a post, J, is set up just outside the line of travel of the wheel D. The upper end of this post is slotted or mortised to receive the lever K, which is fulcrumed therein and extends above the lever F, so that the inner ends of the two levers may be connected by a link or pitman, L. The outer end of this secondary lever extends to any point outside of the line of travel of the wheel and outside the post J, upon which it is fulcrumed, so that its outer end may be connected with the pump by a rod, I, as shown.

N is a counterbalance-weight, which may be adjusted to any desired point upon the vibrating lever.

Having thus described my invention, what I claim as new, and desire to secure by Letters Patent, is—

1. The central pivot having the horizontal arm mounted thereon, and a crank-wheel journaled upon the outer end of the arm, so as to travel upon the ground and support the same, in combination with a lever having its center fulcrumed upon a post fixed upon the arm B, its outer end connected with the crank-pin in said wheel and the inner end with the pump, substantially as herein described.

2. The horizontal arm or bar having its outer end supported by a wheel which travels upon the ground, its inner end fitted to turn about a central pivot, and a lever extending horizontally above the arm and having its center fulcrumed upon a post supported from the arm and its outer end connected with a crank-pin on the traveling wheel, in combination with a secondary lever fulcrumed upon a post outside the line of travel of the wheel, its inner end connected with the primary oscillating lever by a link or pitman and its outer end connected with a pump-rod exterior to the fulcrum-post, substantially as herein described.

In witness whereof I have hereunto set my hand.

HARRY D. WHITE.

Witnesses:
S. H. NOURSE,
H. C. LEE.